(12) United States Patent
Li

(10) Patent No.: US 11,866,345 B2
(45) Date of Patent: Jan. 9, 2024

(54) CONTINUOUS PRODUCTION DEVICE FOR POLYFERRIC CHLORIDE AND METHOD THEREOF

(71) Applicant: Tongji University, Shanghai (CN)

(72) Inventor: Fengting Li, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 337 days.

(21) Appl. No.: 17/202,361

(22) Filed: Mar. 16, 2021

(65) Prior Publication Data

US 2021/0292184 A1    Sep. 23, 2021

(30) Foreign Application Priority Data

Mar. 20, 2020    (CN) .......................... 202010199434.4

(51) Int. Cl.
| | | |
|---|---|---|
| *B01J 19/18* | (2006.01) | |
| *B01J 19/00* | (2006.01) | |
| *B01J 19/20* | (2006.01) | |
| *C01G 49/10* | (2006.01) | |

(52) U.S. Cl.
CPC .......... *C01G 49/10* (2013.01); *B01J 19/0066* (2013.01); *B01J 19/1862* (2013.01); *B01J 19/20* (2013.01); *B01J 2219/00094* (2013.01); *B01J 2219/00155* (2013.01)

(58) Field of Classification Search
CPC ... C01G 49/10; B01J 19/0066; B01J 19/1862; B01J 19/20; B01J 2219/00094; B01J 2219/00155; B01J 10/002

USPC ......................................................... 423/493
See application file for complete search history.

(56) References Cited

FOREIGN PATENT DOCUMENTS

| CN | 102502880 A | * | 6/2012 | |
| CN | 101891258 B | * | 8/2012 | |
| CN | 207192829 U | * | 4/2018 | ........... C01G 49/009 |

OTHER PUBLICATIONS

Machine translation for CN-101891258A (Year: 2023).*
Machine translation for CN-102502880 A (Year: 2023).*
Machine translation for CN-207192829 U (Year: 2023).*

* cited by examiner

*Primary Examiner* — Huy Tram Nguyen
(74) *Attorney, Agent, or Firm* — Bayramoglu Law Offices LLC

(57) ABSTRACT

A device for continuous production of polyferric chloride and a method are disclosed. The device includes a first mixing pipeline, a second reaction pipeline, a third reaction pipeline, and a concentration device sequentially connected. The first mixing pipeline, the second reaction pipeline and the third reaction pipeline are each provided with a circulating spray device, and the circulating spray device includes a reflux pump, a reflux pipeline and an atomizer. The atomizer includes an atomizing pipe, and a chemical filler plate for promoting gas-liquid contact is arranged below the atomizing pipe. The reflux pump is used to extract liquid from each reaction tank, and then transport the liquid to the atomizer on the top of the reaction tank. The atomizer is driven by the pressure of the reflux pump or the motor to atomize the liquid.

6 Claims, 3 Drawing Sheets

CONTINUOUS PRODUCTION DEVICE FOR POLYFERRIC CHLORIDE AND METHOD THEREOF

CROSS REFERENCE TO THE RELATED APPLICATIONS

This application is based upon and claims priority to Chinese Patent Application No. 202010199434.4, filed on Mar. 20, 2020, the entire contents of which are incorporated herein by reference.

TECHNICAL FIELD

The present invention relates to the technical field of preparation of polyferric chloride, and particularly to a continuous production device for polyferric chloride and method.

BACKGROUND

At present, a hydrochloric acid pickling process is used in many steel processing companies in China, but the waste acid produced has not yet been fully utilized. Usually, waste acid is reacted with iron filings to form ferrous chloride, which is then reacted with chlorine gas to produce ferric trichloride solution. Although ferric chloride solution is a highly corrosive inorganic coagulant, it is a very good coagulant among the iron-based coagulants.

Due to the use of different iron-containing raw materials, the current production process of polyferric chloride is different. In the production of iron ore, mill scale, and pyrite as raw materials, hydrochloric acid is first used to dissolve the above substances under certain conditions, and then different oxidants are used to oxidize the remaining ferrous ions. If the amount of HCl in the solution before oxidation is controlled to be higher than or equal to the amount needed to form ferric chloride, a ferric chloride solution containing free acid or a polyferric chloride solution can be formed. If the amount of hydrochloric acid is controlled below the above value, polyferric chloride with different basicity can be produced. The oxidation rate of ferrous ions depends on the oxidant. For example, chlorate is a strong oxidant and can quickly oxidize ferrous ions in the solution. Due to the high price of chlorate, however, the production cost of using the chlorate as raw material is higher. Oxygen is a kind of cheap oxidant.

With a reasonably designed process and equipment, the oxidation rate close to that of chlorate can also be achieved by using oxygen as an oxidant, and the cost can be greatly reduced. The basicity depends on the ratio of chloride ions to iron ions in the solution.

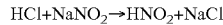
$HCl+NaNO_2 \rightarrow HNO_2+NaCl$

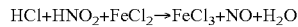
$HCl+HNO_2+FeCl_2 \rightarrow FeCl_3+NO+H_2O$

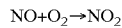
$NO+O_2 \rightarrow NO_2$

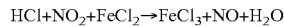
$HCl+NO_2+FeCl_2 \rightarrow FeCl_3+NO+H_2O$

The overall reaction equation is:

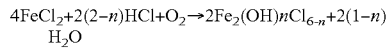
$4FeCl_2+2(2-n)HCl+O_2 \rightarrow 2Fe_2(OH)nCl_{6-n}+2(1-n)H_2O$ (Note: n<2 in all reaction equations)

It can be known from the above reaction equation that the reaction of catalytic oxidation of ferrous ions by nitrogen oxide is a typical gas-liquid reaction. Therefore, the factors that determine the reaction rate are the oxidation rate of NO and the dissolution rate of nitrous oxide ($NO_2$), and the oxidation rate of NO is much higher than the dissolution rate of $NO_2$, so accelerating the dissolution of NO2 becomes the decisive step of the reaction speed.

SUMMARY

The present invention aims to solve the technical problem of low production efficiency due to slow dissolution of $NO_2$ in the existing sodium nitrite catalytic technology.

In order to solve the above technical problems, the technical solution adopted by the present invention is as follows. A continuous production device for polyferric chloride includes a first mixing pipeline, a second reaction pipeline, a third reaction pipeline, a concentration device and a drying device. The first mixing pipeline is provided with a sodium nitrite feed inlet, a ferrous chloride feed inlet, a waste hydrochloric acid mixed liquid inlet, and an oxygen inlet. A liquid outlet end of the first mixing pipeline is connected to the second reaction pipeline, and the second reaction pipeline is provided with a sodium nitrite feed inlet and an oxygen inlet. A liquid outlet end of the second reaction pipeline is connected to the third reaction pipeline, and a top of the third reaction pipeline is provided with an oxygen inlet and a polymerizing agent feed inlet. The first mixing pipeline, the second reaction pipeline and the third reaction pipeline are all provided with a circulating spray device, and the circulating spray device includes a reflux pump, a reflux pipeline and an atomizer, the atomizer includes an atomizing pipe, the atomizing pipe is arranged horizontally and has an atomizing nozzle arranged upwardly. A horizontally arranged chemical filler plate for promoting gas-liquid contact is arranged below the atomizing pipe. The third reaction pipeline is further connected to the concentration device, and the concentration device is provided for evaporation and concentration of polyferric chloride liquid. The concentration device includes a steam chamber and a plurality of screw conveyors. Cylinders of the screw conveyors are located inside the steam chamber, and a motor of the screw conveyors is located outside the steam chamber. The screw conveyors are arranged horizontally and at a same height, a liquid inlet and a liquid outlet of each two adjacent screw conveyors are connected head-to-tail, each cylinder of each screw conveyor is provided with an interlayer, the interlayer is provided with a thermal conductive oil pipeline, and each cylinder is further provided with a steam release port. And the concentration device is further connected to the drying device, and the drying device is provided for drying a concentrated solution.

Further, walls of the steam chamber are made of a heat-insulating material.

Further, a sampling pipeline is further provided on a pipeline between the concentration device and the third reaction pipeline. A liquid outlet of the third reaction pipeline is further provided with a reflux pipe, and the reflux pipe is connected to a liquid inlet of the atomizer of the second reaction pipeline.

Further, the first mixing pipeline, the second reaction pipeline, and the third reaction pipeline all include a pipeline body. A stirring shaft is horizontally arranged inside the pipeline body, and spiral blades are provided on the stirring shaft. A first bevel gear is provided at an end of the stirring shaft, and a drive motor is provided on a top of the pipeline body. The drive motor is connected to a vertical rotating shaft, and an end of the rotating shaft is provided with a second bevel gear meshing with the first bevel gear. The rotating shaft drives the stirring shaft to rotate through the bevel gear set, and a mechanical seal structure is provided at a connection joint between the rotating shaft and the pipeline body.

Further, a left side and a right side of the drying device are respectively symmetrically provided with a fixing seat connection joint. A first feed inlet is provided on one side of the fixing seat connection joint, and a first outlet is provided on the other side of the fixing seat connection joint and at a position 90 degrees from the first feed inlet. A double helix agitator is provided in a middle position inside the drying device. A first jacket is provided outside of the double helix agitator. A thermal conductive oil inlet is provided on one side of the first jacket, and the other side of the first jacket is provided with a thermal conductive oil outlet.

In addition, the present invention further discloses a continuous production method of polyferric chloride, which includes the following steps:

(1) adding waste hydrochloric acid, ferric chloride and sodium nitrite into the first mixing pipeline, stirring and mixing to obtain a mixed liquid; using the reflux pump to extract a first partial liquid from the first mixing pipeline and then transport the first partial liquid to the atomizer on the top of the first mixing pipeline, driving the atomizer by pressure of the reflux pump or the motor to atomize the first partial liquid; during the atomization process, continuously supplying oxygen for performing a preliminary reaction; at the same time of atomization and preliminary reaction of the first partial liquid, passing the first partial liquid into the second reaction pipeline;

(2) after the mixed liquid flows into the second reaction pipeline, using the reflux pump to extract second partial liquid from the second reaction pipeline and then transport the second partial liquid to the atomizer on the top of the second reaction pipeline, driving the atomizer by pressure of the reflux pump or the motor to atomize the second partial liquid; during the atomization process, continuously supplying oxygen and adding sodium nitrite for performing catalytic oxidation reaction; at the same time of atomization and catalytic oxidation reaction of the second partial liquid, passing the second partial liquid into the third reaction pipeline;

(3) after the mixed liquid flows into the third reaction pipeline, using the reflux pump to extract third partial liquid from the third reaction pipeline and then transport the third partial liquid to the atomizer on the top of the third reaction pipeline, driving the atomizer by pressure of the reflux pump or the motor to atomize the third partial liquid; during the atomization process, continuously supplying oxygen and adding a polymerizing agent for performing catalytic oxidation reaction and polymerization reaction; at the same time of atomization, passing the third partial liquid into the concentration device for concentration; and (4) passing the polymerized mixed liquid into the concentration device for concentration to obtain the polyferric chloride liquid; collecting steam generated during the concentration process, and heating the first mixing pipeline by using the steam to promote the reaction; after concentration, a liquid polyferric chloride is obtained; when a solid polyferric chloride is needed, increasing a concentration of a concentrated solution, and then natural cooling under a sealed condition and room temperature to obtain the solid polyferric chloride. The water vapor generated during the drying process is heated by the first mixing pipeline or discharged after condensation, depending on the moisture content of the materials.

It can be seen from the above technical solutions that the present invention has the following advantages. The atomizer combined with the chemical filler plate can promote the contact between $NO_2$ gas and liquid, thereby speeding up the $NO_2$ absorption and reaction speed and improving the catalytic oxidation efficiency of the entire reaction system. The thermal conductive oil is used to heat and evaporate the mixed liquid in the cylinder, the spiral blades of the screw conveyor not only perform a stirring operation, so that the liquid is heated evenly, but also can promote the flow of liquid. The steam chamber can be used to collect steam and recover the heat of the collected steam. A plurality of screw conveyors are arranged side by side, which greatly reduces the space occupied, and the screw conveyors are substantially aligned, which reduces the area of the chamber and the heat exchange between the steam in the chamber and the external environment.

DETAILED DESCRIPTION OF THE EMBODIMENTS

The specific embodiments of the present invention are described in detail below with reference to the drawings.

Figure 1:
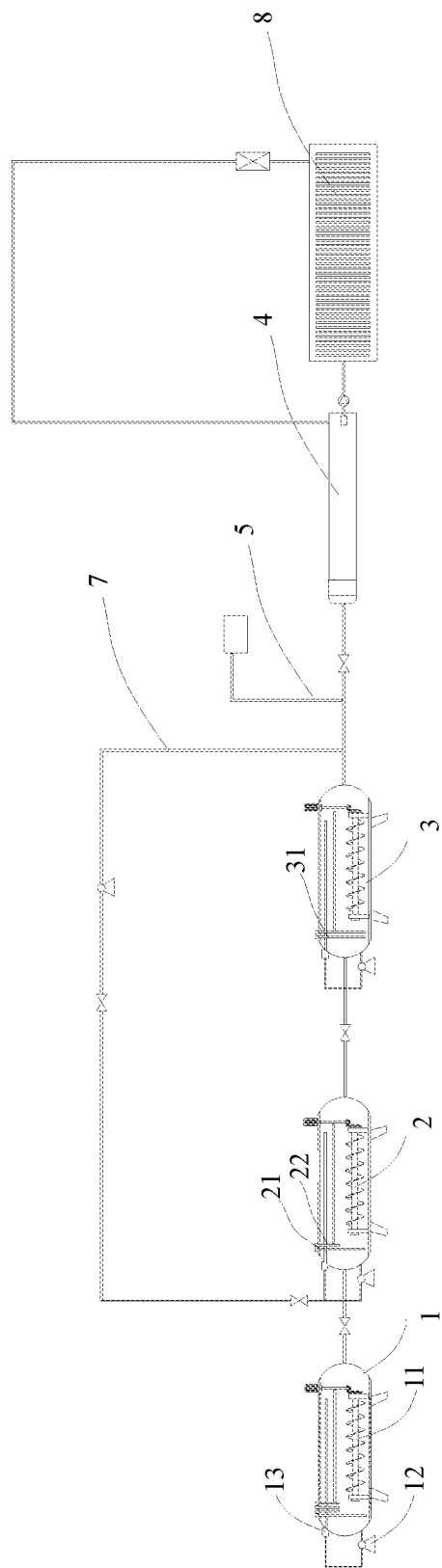
FIG. 1 is a structural schematic diagram of the present invention.
Figure 2:
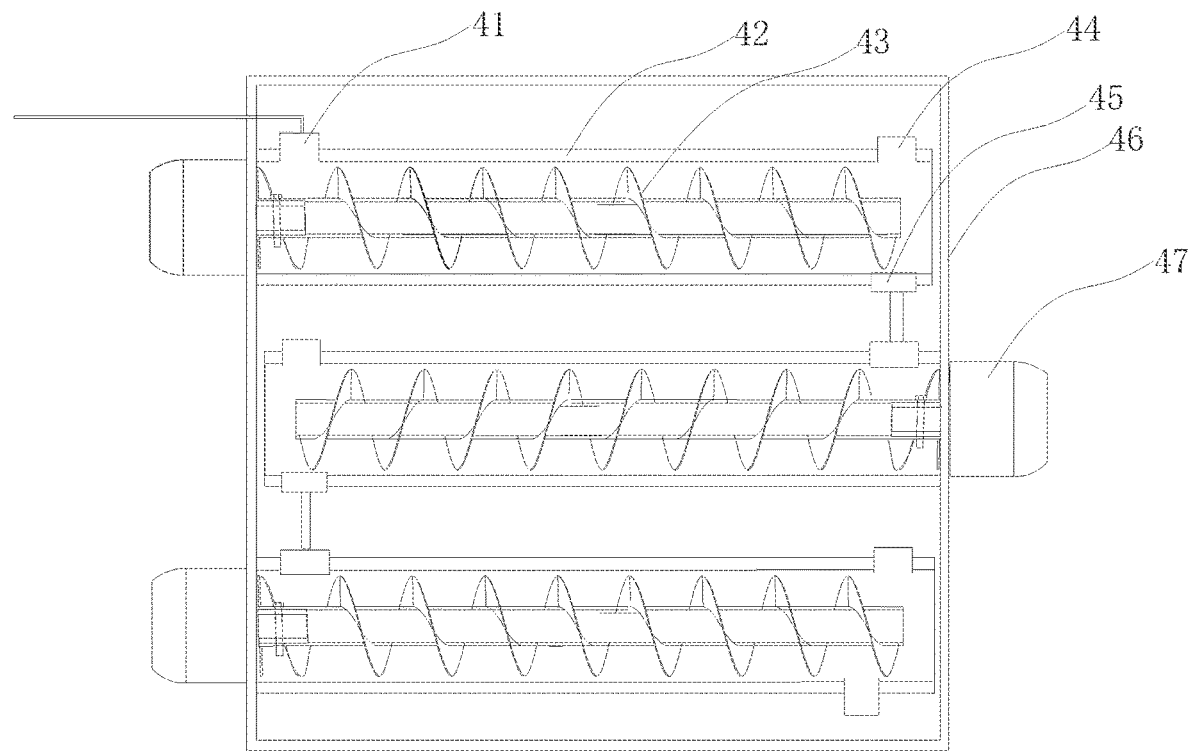
FIG. 2 is a structural schematic diagram of a concentration device of the present invention.
Figure 3:
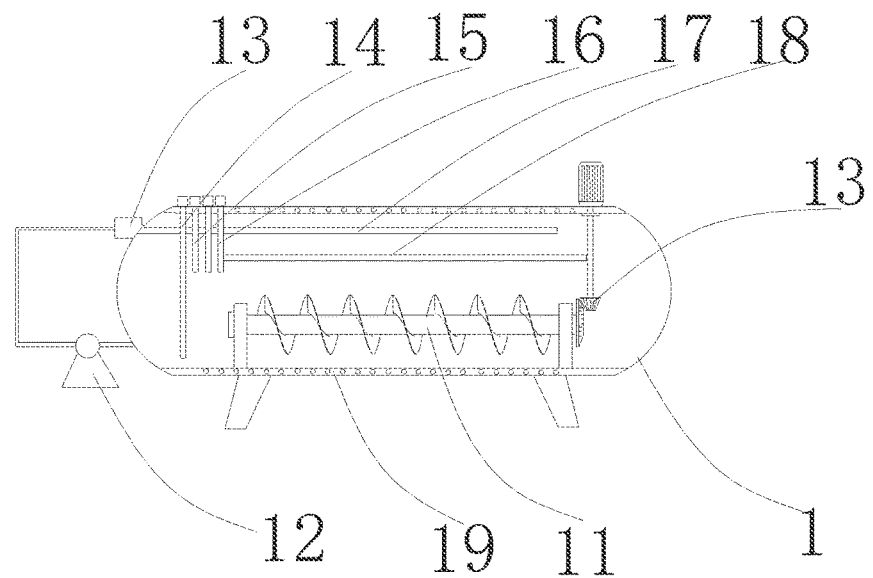
FIG. 3 is a structural schematic diagram of a first mixing pipeline of the present invention.

As shown in FIGS. 1-3, a continuous production device for polyferric chloride of the present invention includes the first mixing pipeline 1, the second reaction pipeline 2, the third reaction pipeline 3, the concentration device 4 and the drying device 8. The first mixing pipeline is provided with the sodium nitrite feed inlet 15, a ferrous chloride feed inlet, the waste hydrochloric acid mixed liquid inlet 16, and the oxygen inlet 14. A liquid outlet end of the first mixing pipeline is connected to the second reaction pipeline, and the second reaction pipeline is provided with the sodium nitrite feed inlet 22 and the oxygen inlet 21; a liquid outlet end of the second reaction pipeline 2 is connected to the third reaction pipeline, and a top of the third reaction pipeline 3 is provided with the oxygen inlet 31 and a polymerizing agent feed inlet. The first mixing pipeline, the second reaction pipeline and the third reaction pipeline are all provided with a circulating spray device.

The circulating spray device includes the reflux pump 12, a reflux pipeline and the atomizer 13, the atomizer 13 includes the atomizing pipe 17, the atomizing pipe 17 is arranged horizontally and has the atomizing nozzle 17 arranged upwardly. The horizontally arranged chemical filler plate 18 for promoting gas-liquid contact is arranged below the atomizing pipe. The atomizer combined with the chemical filler plate can promote the contact between $NO_2$ gas and liquid, thereby speeding up the $NO_2$ absorption and reaction speed and improving the catalytic oxidation efficiency of the entire reaction system, so as to carry out the continuous production.

The third reaction pipeline 3 is further connected to the concentration device 4, and the concentration device 4 is provided for evaporation and concentration of polyferric chloride liquid; the concentration device 4 includes the steam chamber 45 and a plurality of screw conveyors; cylinders of the screw conveyors are located inside the steam chamber, and a motor of the screw conveyors is located outside the steam chamber; the screw conveyors are arranged horizontally and at a same height, a liquid inlet and a liquid outlet of each two adjacent screw conveyors are connected head-to-tail, each cylinder of each screw conveyor is provided with the interlayer 42, the interlayer 42 is provided with a thermal conductive oil pipeline, and each cylinder is further provided with the steam release port 44. The thermal conductive oil is used to heat and evaporate the mixed liquid in the cylinder, the spiral blades of the screw conveyor can not only play a stirring operation, so that the liquid is heated evenly, but also can promote the flow of liquid. The steam chamber can be used to collect steam and recover the heat of the collected steam. A plurality of screw conveyors are arranged side by side, which greatly reduces the space occupied, and the screw conveyors are in substantial alignment, which reduces the area of the chamber and the heat exchange between the steam in the chamber and the external environment.

Figure 4:
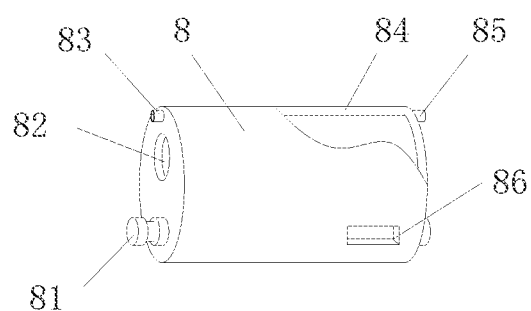
FIG. 4 is a structural schematic diagram of a drying device of the present invention.
Figure 5:
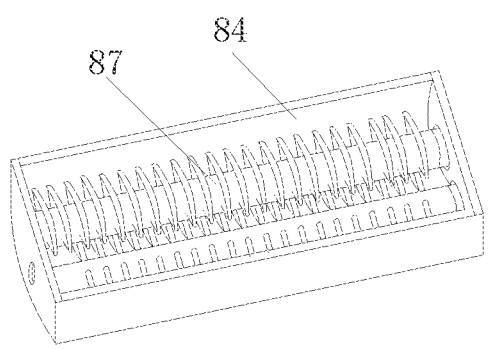
FIG. 5 is a schematic diagram of an internal structure of the drying device of the present invention.

As shown in FIG. 4 and FIG. 5, the two sides of the drying device 8 are respectively symmetrically provided with the fixing seat connection joint 81. The first feed inlet 82 is provided on one side of the fixing seat connection joint 81, and the first outlet 86 is provided on the other side of the fixing seat connection joint 81 and at a position 90 degrees from the first feed inlet 82. The double helix agitator 87 is provided in a middle position inside the drying device 8, the first jacket 84 is provided outside of the double helix agitator 87. The thermal conductive oil inlet 83 is provided on one side of the first jacket 84, and the other side of the first jacket 84 is provided with the thermal conductive oil outlet 85.

Further, the sampling pipeline 5 is further provided on a pipeline between the concentration device and the third reaction pipeline. A liquid outlet of the third reaction pipeline is further provided with the reflux pipe 6, and the reflux pipe 6 is connected to a liquid inlet of the atomizer of the second reaction pipeline. The sampling pipeline can be used to detect the content of ferrous ions, and when the content of ferrous ions is too high and the oxidation is not complete, the mixed liquid can be refluxed for further oxidation treatment.

The first mixing pipeline 1, the second reaction pipeline 2, and the third reaction pipeline 3 each includes a pipeline body. The stirring shaft 11 is horizontally arranged inside the corresponding pipeline bodies, and spiral blades are provided on each stirring shaft. A first bevel gear is provided at an end of the stirring shaft, a drive motor is provided on a top of the pipeline body, the drive motor is connected to a vertical rotating shaft, and an end of the rotating shaft is provided with the second bevel gear 13 meshing with the first bevel gear. The rotating shaft drives the stirring shaft to rotate through the bevel gear set. And a mechanical seal structure is provided at a connection joint between the rotating shaft and the pipeline body. Stirring allows the liquid in the pipeline to be fully mixed, thus increasing the reaction speed and achieving continuous production.

A method of using the above continuous production device includes the following steps:

(1) waste hydrochloric acid, a mixture of ferrous chloride and hydrochloric acid and sodium nitrite are added into the first mixing pipeline, stirred and mixed to obtain a mixed liquid; a reflux pump is used to extract a first partial liquid from the first mixing pipeline and then transport the first partial liquid to the atomizer on the top of the first mixing pipeline, the atomizer is driven by pressure of the reflux pump or the motor to atomize the first partial liquid; during the atomization process, oxygen is continuously supplied for performing preliminary reaction; at the same time of atomization and preliminary reaction of the first partial liquid, the first partial liquid is passed into the second reaction pipeline;

(2) after the mixed liquid flows into the second reaction pipeline, the reflux pump is used to extract second partial liquid from the second reaction pipeline and then transport the second partial liquid to the atomizer on the top of the second reaction pipeline, the atomizer is driven by pressure of the reflux pump or the motor to atomize the second partial liquid; during the atomization process, oxygen is continuously supplied and sodium nitrite is added for performing catalytic oxidation reaction; at the same time of atomization and catalytic oxidation reaction of the second partial liquid, the second partial liquid is passed into the third reaction pipeline;

(3) after the mixed liquid flows into the third reaction pipeline, the reflux pump is used to extract third partial liquid from the third reaction pipeline and then transport the third partial liquid to the atomizer on the top of the third reaction pipeline, the atomizer is driven by pressure of the reflux pump or the motor to atomize the third partial liquid; during the atomization process, oxygen is continuously supplied and a polymerizing agent is added for performing catalytic oxidation reaction and polymerization reaction; at the same time of atomization, the third partial liquid is passed into the concentration device for concentration; and (4) the polymerized mixed liquid is passed into the concentration device for concentration to obtain the polyferric chloride liquid; steam generated during the concentration process is collected, and the first mixing pipeline is heated by using the steam to promote the reaction; after concentration, a liquid polyferric chloride is obtained; when a solid polyferric chloride is needed, the concentration can be increased, and then natural cooled under a sealed condition and room temperature to obtain the solid polyferric chloride.

What is claimed is:

1. A continuous production device for polyferric chloride, comprising: a first mixing pipeline, a second reaction pipeline, a third reaction pipeline, a concentration device and a drying device; wherein the first mixing pipeline is provided with a first sodium nitrite feed inlet, a ferrous chloride feed inlet, a waste hydrochloric acid mixed liquid inlet, and a first oxygen inlet; a liquid outlet end of the first mixing pipeline is connected to the second reaction pipeline, and the second reaction pipeline is provided with a second sodium nitrite feed inlet and a second oxygen inlet; a liquid outlet end of the second reaction pipeline is connected to the third reaction pipeline, and a top of the third reaction pipeline is provided with a third oxygen inlet and a polymerizing agent feed inlet; the first mixing pipeline, the second reaction pipeline and the third reaction pipeline are each provided with a circulating spray device, and the circulating spray device comprises a reflux pump, a reflux pipeline and an atomizer, the atomizer comprises an atomizing pipe, the atomizing pipe is arranged horizontally and the atomizing pipe has an atomizing nozzle arranged upwardly; a horizontally arranged chemical filler plate for promoting gas-liquid contact is arranged below the atomizing pipe; the third reaction pipeline is further connected to the concentration device, and the concentration device is provided for an evaporation and a concentration of a polyferric chloride liquid; the concentration device comprises a steam chamber and a plurality of screw conveyors; cylinders of the plurality of screw conveyors are located inside the steam chamber, and a motor of each screw conveyor of the plurality of screw conveyors is located outside the steam chamber; the plurality of screw conveyors are arranged horizontally and at a same height, a liquid inlet and a liquid outlet of each two adjacent screw conveyors of the plurality of screw conveyors are connected head-to-tail, each cylinder of the each screw conveyor is provided with an interlayer, the interlayer is provided with a thermal conductive oil pipeline, and the each cylinder is further provided with a steam release port; and the concentration device is further connected to the drying device, and the drying device is provided for drying a concentrated solution.

2. The continuous production device according to claim 1, wherein walls of the steam chamber are made of a heat-insulating material.

3. The continuous production device according to claim 1, wherein a sampling pipeline is further provided on a pipeline between the concentration device and the third reaction pipeline, a liquid outlet of the third reaction pipeline is further provided with a reflux pipe, and the reflux pipe is connected to a liquid inlet of the atomizer of the second reaction pipeline.

4. The continuous production device according to claim 1, wherein each of the first mixing pipeline, the second reaction pipeline, and the third reaction pipeline comprises a pipeline body, a stirring shaft is horizontally arranged inside the pipeline body, and spiral blades are provided on the stirring shaft; a first bevel gear is provided at an end of the stirring shaft, a drive motor is provided on a top of the pipeline body, the drive motor is connected to a vertical rotating shaft, and an end of the vertical rotating shaft is provided with a second bevel gear, and the second bevel gear meshes with the first bevel gear, the vertical rotating shaft drives the stirring shaft to rotate through the first bevel gear and the second bevel gear; and a mechanical seal structure is provided at a connection joint between the vertical rotating shaft and the pipeline body.

5. The continuous production device according to claim 1, wherein a left side and a right side of the drying device are respectively symmetrically provided with a fixing seat connection joint; a first feed inlet is provided on a first side of the fixing seat connection joint, and a first outlet is provided on a second side of the fixing seat connection joint and the first outlet is arranged at a position 90 degrees from the first feed inlet; and a double helix agitator is provided in a middle position inside the drying device.

6. A continuous production method of the polyferric chloride, using the continuous production device according to claim 1, wherein the continuous production method comprises the following steps:

(1) adding waste hydrochloric acid, ferric chloride and sodium nitrite into the first mixing pipeline, stirring and mixing to obtain a mixed liquid; using the reflux pump to extract a first partial liquid of the mixed liquid from the first mixing pipeline and then transport the first partial liquid to the atomizer on a top of the first mixing pipeline, driving the atomizer by a pressure of the reflux pump or a drive motor to atomize the first partial liquid; during a first atomization process, continuously supplying oxygen for performing a preliminary reaction on the first partial liquid to obtain a preliminary reacted liquid; at the same time of the first atomization process and the preliminary reaction of the first partial liquid, passing the preliminary reacted liquid into the second reaction pipeline;

(2) after the preliminary reacted liquid flows into the second reaction pipeline, using the reflux pump to extract a second partial liquid of the preliminary reacted liquid from the second reaction pipeline and then transport the second partial liquid to the atomizer on a top of the second reaction pipeline, driving the atomizer by the pressure of the reflux pump or the drive motor to atomize the second partial liquid; during a second atomization process, continuously supplying the oxygen and adding the sodium nitrite for performing a first catalytic oxidation reaction on the second partial liquid to obtain an oxidized mixed liquid; at the same time of the second atomization process and the first catalytic oxidation reaction of the second partial liquid, passing the oxidized mixed liquid into the third reaction pipeline;

(3) after the oxidized mixed liquid flows into the third reaction pipeline, using the reflux pump to extract a third partial liquid of the oxidized mixed liquid from the third reaction pipeline and then transport the third partial liquid to the atomizer on the top of the third reaction pipeline, driving the atomizer by the pressure of the reflux pump or the drive motor to atomize the third partial liquid; during a third atomization process, continuously supplying the oxygen and adding the polymerizing agent for performing a second catalytic oxidation reaction and a polymerization reaction on the third partial liquid to obtain a polymerized mixed liquid; at the same time of the third atomization process, passing the polymerized mixed liquid into the concentration device for a concentration of the polymerized mixed liquid; and (4) passing the polymerized mixed liquid into the concentration device for the concentration of the polymerized mixed liquid to obtain the polyferric chloride liquid; collecting steam generated during the concentration of the polymerized mixed liquid, and pre-heating the first mixing pipeline; after the concentration of the polymerized mixed liquid, the polyferric chloride liquid is obtained; when a solid polyferric chloride is needed, concentrating the polyferric chloride liquid to a predetermined concentration to obtain a concentrated polyferric chloride liquid, and then natural cooling the concentrated polyferric chloride liquid under a sealed condition and room temperature to obtain the solid polyferric chloride with a block shape.

* * * * *